US007601056B2

(12) United States Patent
Watanabe

(10) Patent No.: US 7,601,056 B2
(45) Date of Patent: Oct. 13, 2009

(54) MUSIC GAME SOFTWARE AND MUSIC GAME MACHINE

(75) Inventor: Tsutomu Watanabe, Tokyo (JP)

(73) Assignee: Konami Corporation, Tokyo (JP)

( * ) Notice: Subject to any disclaimer, the term of this patent is extended or adjusted under 35 U.S.C. 154(b) by 882 days.

(21) Appl. No.: 10/828,664

(22) Filed: Apr. 21, 2004

(65) Prior Publication Data

US 2005/0026687 A1 Feb. 3, 2005

(30) Foreign Application Priority Data

Jul. 30, 2003 (JP) ............................ 2003-283046

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/7; 463/35; 463/36; 463/37

(58) Field of Classification Search .................... 463/7, 463/35–37

See application file for complete search history.

(56) References Cited

U.S. PATENT DOCUMENTS 6,609,979 B1 * 8/2003 Wada .......................... 463/43

FOREIGN PATENT DOCUMENTS

| | | |
|---|---|---|
| EP | 0 823 270 A | 2/1998 |
| EP | 0 903 169 A | 3/1999 |
| EP | 1 132 888 A | 9/2001 |
| EP | 04 010 750.0 | 9/2004 |
| JP | 08 335088 A | 12/1996 |
| JP | 2000-14931 A | 1/2000 |

OTHER PUBLICATIONS

GameFAQs: PaRappa the Rapper: FAQ/Walkthrough by Ryouga, Jan. 23, 2002, <http://www.gamefaqs.com/console/psx/file/198264/15641>.*

Wikipedia.org: PaRappa the Rapper by MartinHarper, Feb. 12, 2003, <http://en.wikipedia.org/w/index.php?title=PaRappa_the_Rapper&oldid=3565558>.*

"Weekly Famitsu" Aug. 1, 2003, Kabushiki Kaisha Ent., Engl. Trans.

* cited by examiner

*Primary Examiner*—Dmitry Suhol
*Assistant Examiner*—Jason Pinheiro
(74) *Attorney, Agent, or Firm*—Duane Morris LLP

(57) ABSTRACT

Music game program stored in a computer readable medium for causing a computer to output music data that corresponds to music, selected by a player, through an input device from a sound output device. The program also causes the computer to execute a procedure for displaying, on a display, a background image that corresponds to the music data. A computing a demand command invites a user to operate a specific key in correspondence with partial song data. Each demand command is produced as a command image which corresponds to each key. The command images are displayed in the order of playback of the partial song data and move on the display. A procedure for judging determines whether or not keys were operated with a predetermined timing. A procedure is also provided for outputting partial song data in which playback pitch is changes according to the result of the judgment procedure.

3 Claims, 6 Drawing Sheets

MUSIC GAME SOFTWARE AND MUSIC GAME MACHINE

BACKGROUND OF THE INVENTION

The invention relates to music game software and a music game machine for outputting words with melody as sounds by operating operation members of an input device with a proper timing by a player so as to correspond to command images which are displayed on a game screen in order.

"Game software" in the specification includes program itself and various kinds of data related to the program if necessary. It is not always necessary to relate "game software" to the data, but "game software" has always program. And, "the related various kinds of data" may be stored in a memory means, such as a ROM disc, together with the program. Furthermore, these data may be stored in an outside memory means so as to be freely read out through a communication medium means, such as the Internet.

In such kind of well-known conventional music software, such as game software KEYBOARDMANIA ® "KEYBOARD MANIA" by KONAMI CORPORATION, an input device is a music keyboard having music keys, and a player operates corresponding keys with a proper timing in obedience to images for inviting to operate keys (command images) to be displayed on a game screen in order. so that desired music is outputted.

In such music game software, a command image on a game screen and each key of the music keyboard are corresponded to each other with one-to-one, and even a player who can not understand a musical score can easily play music by operation of the key of the music keyboard which corresponds to the command image on a game screen with a proper timing, and besides, a competition for superiority of a musical performance is possible.

In such a system, a dedicated input device, such as a music keyboard, is necessary, but, a proper musical performance (input operation) is impossible due to an insufficient number of the operation keys of an input device of a general purpose game machine.

Besides, in the game software for the lower age a complex keyboard operation may lose the interest in the game, so further improvement may be necessary. In case where words are outputted as "a song" together with melody by displaying command images on a screen and operating an input device, the operation of a music keyboard by a player and singing a song are wide apart, then there is a danger of lack of the fun.

In a system where a music keyboard is operated so as to match a command image on a screen, an operation error immediately results in an error of the corresponding sound or speed delay. In result, the outputted music is artless, then, the superiority of the operation, that is, the superiority of the game can be easily judged. But, a problem to be solved when outputting words with melody with an easy operation of operation keys is how does the superiority of the operation affect output and how to express the superiority of the operation.

Due to the above-mentioned reasons, developments of music game software and music game machine for playing back words with melody with a small number of operation keys as an input device of a generous purpose game machine as the game for competing for superiority of the operation of the input device, and for properly giving the influence of the superiority of the operation to the output are still desired.

SUMMARY OF THE INVENTION

The invention is music game software for getting a computer to output music data corresponding to music selected by a player through an input means from a sound output means and to execute a procedure for displaying a background image corresponding to said music data on a display, comprising:

a music file for storing a plurality of said music data;

said music data having song data with melody being comprised of words and a melody corresponding to said words;

said song data with melody having a plurality of partial song data with melody obtained by dividing the whole words and the whole melody in the plural number in its playback order; and each said partial song data with melody being comprised of words having one or more characters and melody corresponding to said words;

said music game software being a program for getting said computer to further execute following procedures:

a demand command computing procedure for reading said music data corresponding to said music selected by said player through said input means out of said music file and for computing a demand command for inviting said player to operate a specific operation key of said input means (such as direction keys 5*b*, 5*c*, 5*d* and 5*e*) so as to correspond to each said partial song data with melody of said read music data;

a command image producing procedure for producing each said demand command as a command image corresponding to each said operation key of said input means;

a command image displaying procedure for displaying said produced command image, being moved on said display in the order of playback of said partial song data with melody, and for setting an operation criterion position at a predetermined position on said display and displaying it;

a timing judging procedure for judging as to whether or not said operation key was operated with a predetermined timing on the basis of a positional relation between said command image displayed moving on said display and said operation criterion position; and a music playback procedure for arithmetically processing for changing a pitch at the time of playback of said partial song data with melody corresponding to said command image from a pitch which is stored in said music file (For instance, the start pitch which is the pitch at the time of playback start, is changed or the subsequent playback pitch is changed upwardly or downwardly with respect to the partial song data with melody which is stored in the music file) according to a judgment result of an operation timing of said operation key corresponding to each said command image by said timing judging procedure and for outputting through said sound output means.

According to this aspect of the invention, the words with melody are played back every partial song data with melody (PPD) having the words and the melody corresponding thereto in response to the operation of the operation key by the player, so that a complex operation, such as the operation of the operation key every sound for making a melody, is not necessary, the words with melody can be properly played back with a small number of operation keys, and the more interesting music game software can be provided.

Besides, the music playback procedure arithmetically processes for changing a pitch at the time of playback of the partial song data with melody corresponding to the command image according to the result of the operation timing of the operation key corresponding to each command image which was judged by the timing judging procedure, and outputs through the sound outputting means, so that the superiority of the operation of the operation key can properly affect the playback pitch.

Besides, the invention is the music game software, wherein said timing judging procedure has an accumulated evaluation value computing procedure for computing time difference between a time said command image displayed being moved on said display passed through said operation criterion position and a time said operation key was operated, for computing an evaluation point so as to correspond to said computed time difference, for obtaining an accumulated evaluation value by accumulating said evaluation point every each demand command, and for storing said accumulated evaluation value in a memory means.

According to this aspect of the invention, the accumulated evaluation value computing procedure computes the time difference between the time the command image displayed being moved on the display passed through the operation criterion position and the time the operation key was operated, and computes the evaluation point so as to correspond the computed time difference, and obtains the accumulated evaluation value (VL) by accumulating the evaluation value every each demand command, and stores the accumulated evaluation value in the memory means, so that the superiority of the operation of the operation key by the player can be objectively obtained as a value by the accumulated evaluation value.

Besides, the invention is the music game software, wherein said music playback procedure has a start pitch change procedure for changing a start pitch according to said accumulated evaluation value when playing back said partial song data with melody.

According to this aspect of the invention, the start pitch change procedure changes the start pitch at the time of playback of the partial song data with melody according to the accumulated evaluation value, so that so-called "tone-deaf" state can be expressed according to the superiority of the operation of the operation key at the time of playback of the music data, thereby increasing the fun of the game.

Besides, the invention is the music game software, wherein said music playback procedure has a playback pitch changing procedure for playing back said partial song data with melody, changing a pitch to be played back with time during a predetermined time after start of playback according to said accumulated evaluation value.

According to this aspect of the invention, the playback pitch change procedure plays back the partial song data with melody according to the accumulated evaluation value, changing a pitch to be played back with time during a predetermined time after start of playback, so that "tone-deaf" state can be expressed with reality, thereby increasing the fun of the game.

Besides, the invention is a music game machine for outputting music data corresponding to music selected by a player through an input means from a sound output means and for displaying a background image corresponding to said music data on a display, comprising:

a music file for storing a plurality of said music data;

said music data having song data with melody being comprised of words and a melody corresponding to said words;

said song data with melody having a plurality of partial song data with melody obtained by dividing the whole words and the whole melody in the plural number in its playback order; and each said partial song data with melody being comprised of words having one or more characters and melody corresponding to said words;

said music game machine further comprising:

a demand command computing means for reading said music data corresponding to said music selected by said player through said input means out of said music file and for computing a demand command for inviting said player to operate a specific operation key of said input means so as to correspond to each said partial song data with melody of said read music data;

a command image producing means for producing each said demand command as a command image corresponding to each said operation key of said input means;

a command image displaying means for displaying said produced command image, being moved on said display in the order of playback of said partial song data with melody, and for setting an operation criterion position at a predetermined position on said display and displaying it;

a timing judging means for judging as to whether or not said operation key was operated with a predetermined timing on the basis of a positional relation between said command image displayed moving on said display and said operation criterion position; and a music playback means for arithmetically processing for changing a pitch at the time of playback of said partial song data with melody corresponding to said command image from a pitch which is stored in said music file according to a judgment result of an operation timing of said operation key corresponding to each said command image by said timing judging means and for outputting through said sound output means.

DESCRIPTION OF THE PREFERRED EMBODIMENT

An embodiment of the invention is now explained, referring to appended drawings.

Figure 1:
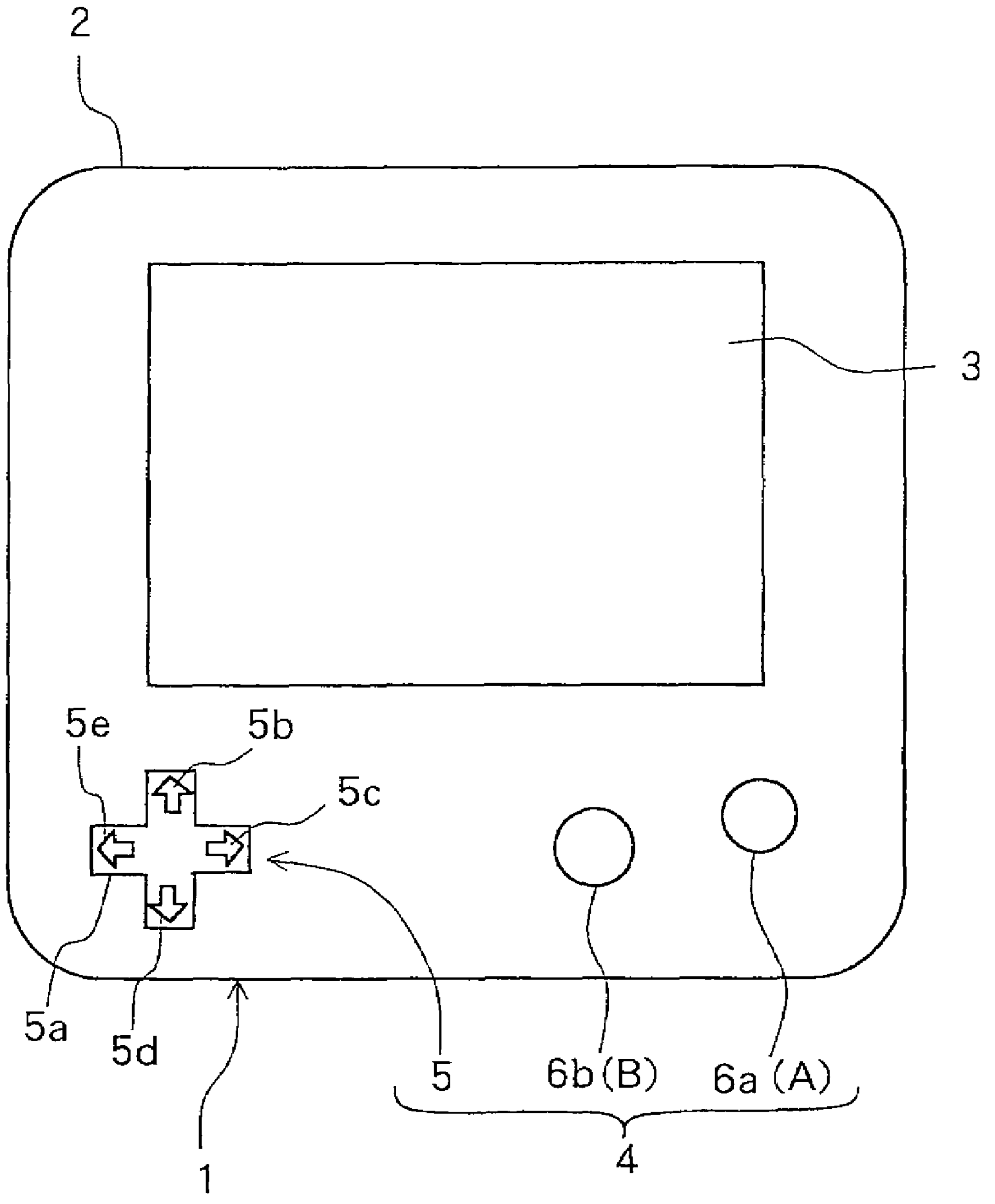
FIG. 1 is a view showing appearances of a portable game machine to which the invention is applied.

FIG. 1 shows a portable game machine as a game machine for forming a game system. A portable game machine 1 has a main body 2, a reflective liquid crystal display 3 attached to the main body 2 as a display unit, and an input device 4. The input device 4 has a direction switch 5 and a plurality of push button switches **6*a*, 6*b*. The direction switch 5 has a cross type of operation member 5*a*, for instance, and outputs a signal corresponding to each operation in up and down directions and in right and left directions of the operation member 5*a***

(the operation of pushing down the end portion of the upper portion, the lower portion, the right portion or the left portion of the operation member).

A structure of such input device 4 is well-known, so various transformations are possible. For instance, four push buttons may be respectively located in upper and lower hands and in right and left hands, in place of the operation member 5*a*. The number of the push button switches 6*a*, 6*b* and their location may be changed in various forms. In the following descriptions, the push button switch 6a is referred to as A button, and the push button switch 6*b* as B button. If it is not necessary to differentiate both push buttons 6*a*, 6*b* from each other, it is referred to as a button 6. And, the game machine 1 is provided with a power switch, an operation member for adjusting sound volume and the like, but these are omitted.

Figure 2:
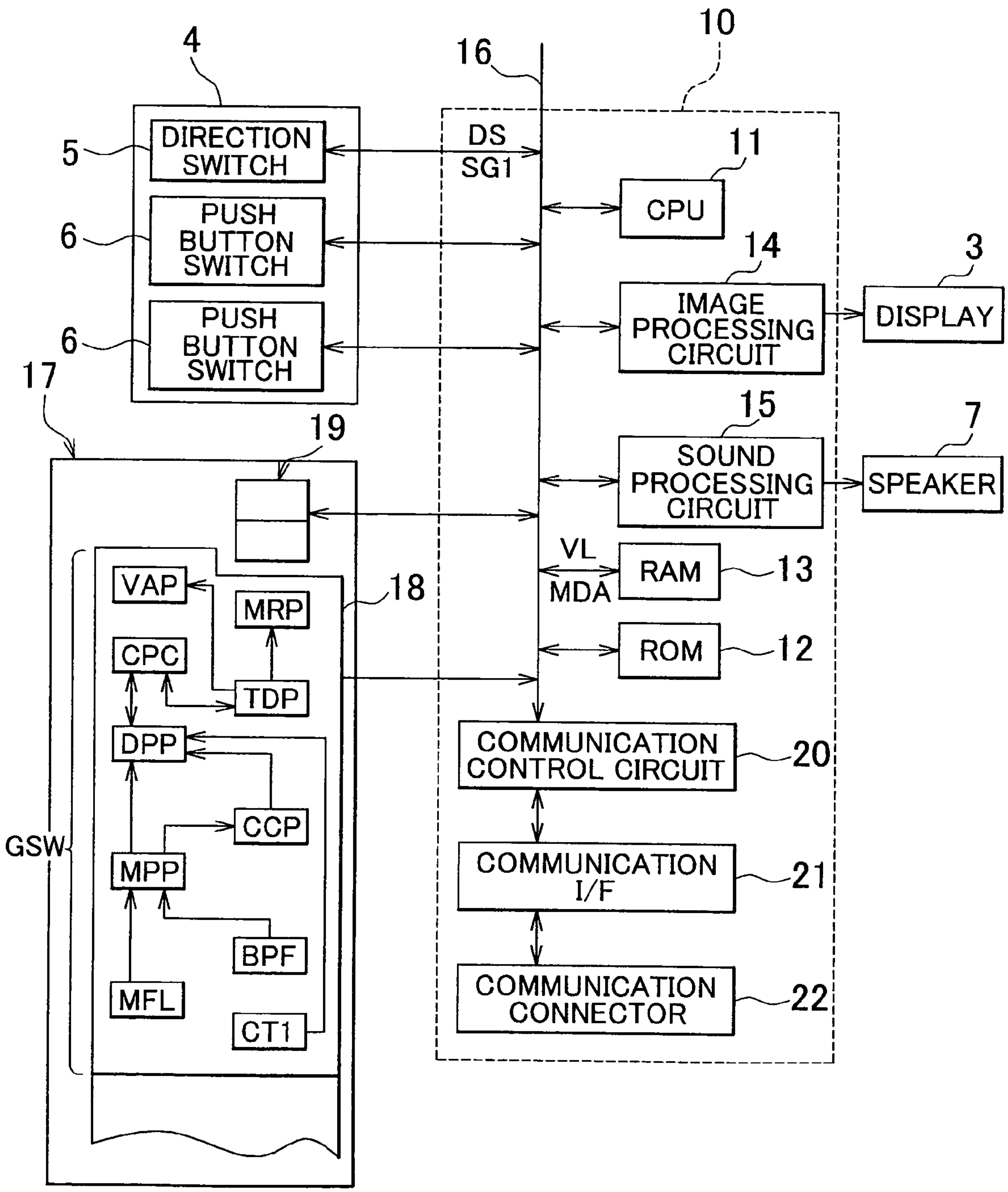
FIG. 2 is a control block diagram of the game machine of FIG. 1.

FIG. 2 shows a structure of a control unit 10 provided at the game machine 1. The control unit 10 is a computer making use of a microprocessor, main body of which is a CPU 11. A ROM 12 (read only memory) and a RAM 13 (random access memory) as main memories, an image processing circuit 14 and a sound processing circuit 15 are respectively connected with the CPU 11 through a bus 16. A program necessary for basic control of the game machine 1 (booting processing, for instance) is stored in the ROM 12. A work area with respect to the CPU 11 is secured in the RAM 13. The image processing circuit 14 controls the liquid crystal display 3 in response to a picturing instruction from the CPU 11 so as to display a predetermined image on its screen. The sound processing circuit 15 produces an analog sound signal in obedience to a sounding instruction received from the CPU 11 and outputs this signal to a speaker 7.

The respective switches 5, 6 of the input device 4 are connected with the CPU 11 through the bus 16, and the CPU 11 can thereby judge the state of operation of the respective switches 5, 6. Besides, an external memory 17, which is an object different from the control unit 10, is connected with the bus 16. The external memory 17 is comprised of a cartridge detachably attaching to the main body 2, for instance, and a ROM 18 as memory medium and a RAM 19 (random-access memory) as a reloadable user memory are provided therein. Program, such as sound game software GSW, and various data necessary for executing this program are stored in the ROM 18 in advance. The reloadable ROM, such as a flash memory, is used as the memory 19, and save data of a game, for instance, are stored in the memory if necessary. Various storage mediums, such as a magnetic storage medium, an optical storage medium and a photoelectric magnetic storage medium, may be used as the storage medium of the external memory 17, in addition to a semiconductor storage element. An interface circuit intervenes between the bus 16 and each element, if necessary, but this is not shown. Various kinds of control units 10 may be used without limiting to the above-mentioned structure.

A communication control circuit 20 is connected with the CPU 11 through the bus 16 in order to connect the game machine 1 with a predetermined communication line, an another game machine or the like. A communication connector 22 is connected with the communication control circuit 20 through a communication interface 21. As the communication control circuit 20, one functioning as a modem or a network interface by combining a DSP (digital signal processor) and software with each other, for instance, may be utilized. The communication connector 22 and/or the interface 21 may be provided as a peripheral equipment to be connected with the game machine 1 outside.

The program stored in the ROM 18 of the external memory 17 is loaded to the RAM 13 so as to execute this program by the CPU 11 in the game machine 1 having the above-mentioned structure, and people can play various kinds of games on the screen of the display 3, thereby. Besides, the game machine 1 is connected with a predetermined network, controlling the communication control circuit 20, thereby messages can be exchanged and a pitched battle type of game can be enjoyed between this game machine 1 and an another game machine.

When executing a predetermined initializing operation (power-on operation, for instance) in the game machine 1, the CPU 11 firstly executes predetermined initialization according to the program of the ROM 12. When finishing initialization, the CPU 11 starts to read the sound game software GSW stored in the RAM 18 of the external memory 17 into the ROM 13, and starts game processing according to the program. When a player operates the input device 4 so as to execute a predetermined game start operation, the CPU 11 starts various kinds of control necessary for the execution of the game according to the procedures of the sound game software GSW.

The computer for executing the game software according to the invention is the game machine 1 as a portable game machine, but the game machine 1 may be a game machine for home use. Besides, the game machine 1 may not be a device dedicated for a game, but may be a device for playing back general music and images stored in a storage medium. Furthermore, any computer, such as a personal computer and a mobile phone, is available as long as game software can be executed thereby.

A player firstly selects a music which the player wants to be played with the music game software GSW through the input device 4, and instructs the CPU 11. The CPU 11 reads music data MDA corresponding to the music selected by the player out of a music file MFL which is stored in the music game software GSW so as to store the data in the RAM 13, and starts to process according to music processing program MPP of the music game software GSW. A plurality of pieces of music to be played with the game machine 1 by the music game software GSW are stored in the music file MFL as the music data MDA so as to be selectively read out in response to a music selection signal corresponding to the operation of the input device 4 by a player according to the music game software GSW.

Various kinds of data of the music game software GSW, such as the music data MDA, may be stored in any form as long as the data can be read out by the function of the program of the music game software GSW. These data may be stored in the external memory 17 together with the program of the game software GSW as the present embodiment, or may be stored in an outside memory means independent of the game machine 1 so as to download these data in a memory, such as the RAM 13, through a communication medium means, such as the Internet with read program which is set in the game software GSW.

Figure 6:
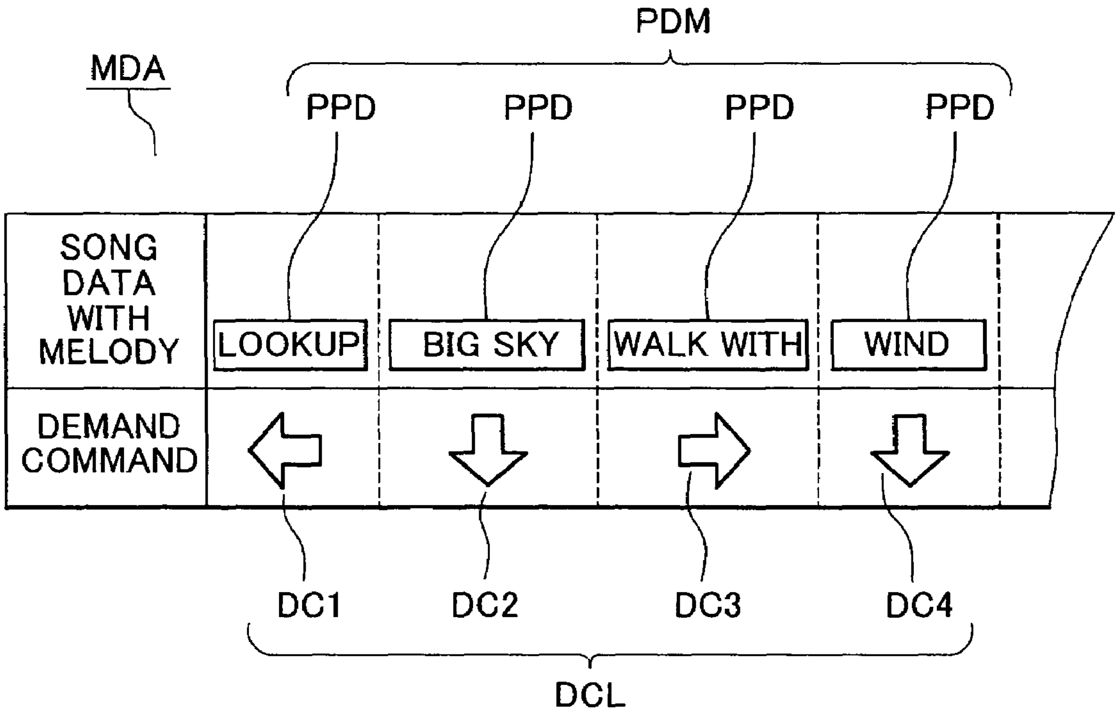
FIG. 6 is a typical view for showing correspondence relation between song data with melody and demand command.

The respective music data MDA are song data with melody PDM which is comprised of words and melody corresponding to the words, as shown in FIG. 6, and the song data with melody PDM is comprised of a plurality of partial song data with melody PPD. The partial song data with melody PPD is obtained by dividing the whole words and whole melody in the plural number in its playback order. Each partial song data with melody PPD is comprised of one or more characters of words and the melody corresponding thereto. Each partial song data with melody PPD has the playback order and the playback time as its attribute data. The CPU 11 and the sound processing circuit 15 play back the respective partial song data with melody PPD in order on the basis of the attribute data-owned by each partial song data with melody PPD with the music game software GSW, so that the speaker 7 can output the song data with melody PDM in a correct order.

In FIG. 6 for instance, four partial song data with melody PPD, "LOOK UP", "BIG SKY", "WALK WITH" and "WIND" (The actual song data with melody PDM is not comprised of these four parts, but of many partial song data with melody PPD. For easy explanation, the number of the partial song data with melody PPD is four.) are stored together with melody data, and the song data with melody PDM is comprised of these four partial song data with melody PPD. The CPU 11 and the sound processing circuit 15 can play back the song data with melody PDM "LOOK UP BIG SKY, WALK WITH WIND" on the basis of the playback order attaching to each partial song data with melody PPD with the music game software GSW through the speaker 7.

The music processing program MPP computes for allotting the respective partial song data with melody PPD comprising the song data PDM to respective direction keys 5*b*, 5*c*, 5*d* and 5*e* of the operation member 5*a* of the input device 4 as shown in FIG. 1. As already mentioned, the operation member 5*a* is a key for instructing up, down, right and left directions to the CPU 11, and a direction signal DS respectively corresponding to the direction key 5*b*, 5*c*, 5*d* or 5*e* can be outputted to the CPU 11 when operating the end portion of the cross thereof. That is, the direction key 5*b* can output the direction signal DS for instructing up direction to the CPU 11, the direction key 5*c* can output the direction signal DS for instructing right direction, the direction key 5*d* down direction and the direction key 5*e* left direction.

Any of the partial song data with melody PPD comprising the music data MDA has one demand command DC corresponding to the partial song data with melody PPD as the attribute data in addition to the playback order so as to have one-to-one correspondence. The CPU 11 reads out the demand commands DC of the partial song data with melody PPD comprising the music data MDA which was selected to be played back by the player in the playback order on the basis of the playback order data with the music processing program MPP, and computes for producing a demand command line DCL having a plurality of demand commends DC arranged in the playback order of the respective partial song data with melody PPD, as shown in FIG. 6.

The demand command DC is one for inviting the player to operate a specific operation key of the input means in order to get the computer (the CPU 11) to play back the partial song data with melody PPD by the player. When the player operates the operation key corresponding to the demand command DC at a predetermined timing, the CPU 11 is controlled to play back the corresponding partial song data with melody PPD.

Each command DC is comprised of data showing up, down, right or left direction corresponding to the direction signal DS which the direction key 5*b*, 5*c*, 5*d* or 5*e* of the input device 4 outputs, as shown in FIG. 6, and the command line DCL is comprised of demand commands DC1, DC2, DC3 and DC4 shown with arrows showing four directions "←", "↓", "→" and "↓" which correspond to each partial song data with melody PPD in order from the left side of FIG. 6. Each command DC1, DC2, DC3 or DC4 corresponds to each partial song data with melody PPD so as to have one-to-one correspondence, so that the same direction commands DC and DC4 directions of which are "↓" and "↓" can be differentiated from each other by a control parameter (not shown) as separate data as long as both partial song data with melody PPD corresponding thereto are different from each other.

In the above-mentioned explanation, each command DC for forming the command line DCL is stored as the attribute data of each partial song data with melody PPD. But, each command DC may be randomly produced so as to correspond to each partial song data with melody PPD when reading out the music data MDA, or may be produced by the computation with character code of characters for comprising the partial song data with melody PPD. For instance, "0", "1", "2" and "3" which are surpluses obtained at the time when dividing the character code (in case of a numeral) by four (4) maybe respectively allotted to the demand commands DC1, DC2, DC3 and DC4 of "←", "↓", "→" and "↓".

Figure 3:
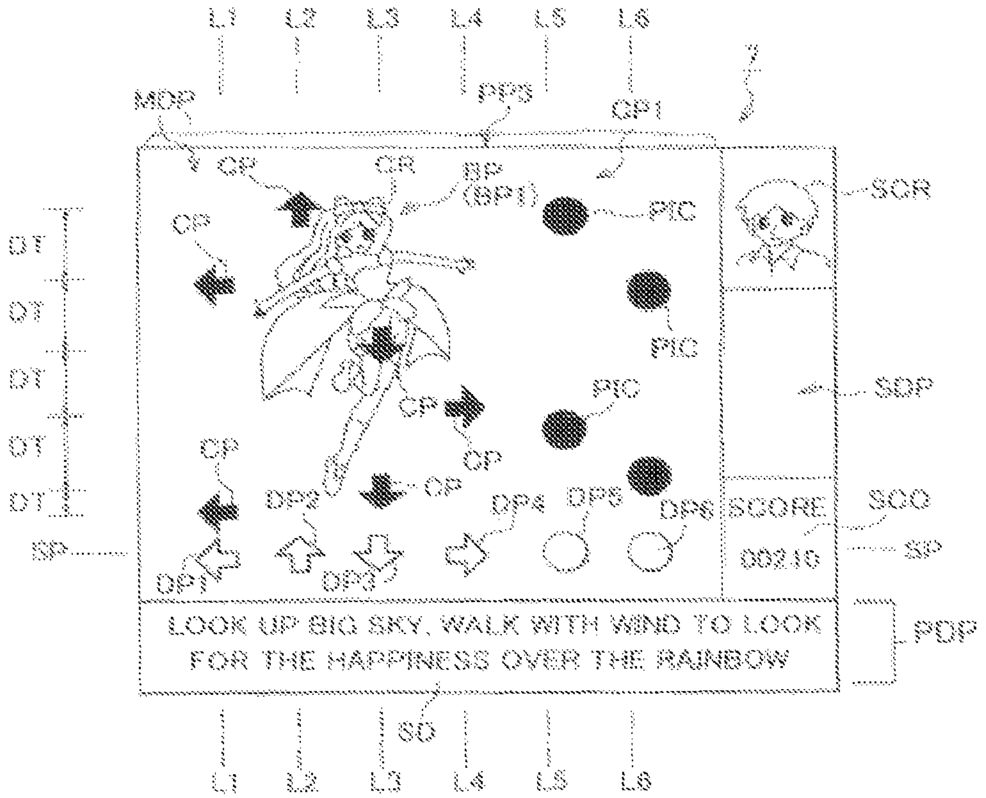
FIG. 3 is a view showing a game screen on a display.

The music processing program MPP instructs the CPU 11 to produce a command image CP corresponding to each direction key 5*b*, 5*c*, 5*d* or 5*e* of the input device 4 on the basis of the read command line DCL according to command producing program CCP. Receiving this instruction, the CPU 11 produces the command image CP formed with a black arrow as shown in FIG. 3 for instance which corresponds to each demand command DC for forming the command line DCL.

Subsequently, the music processing program MPP instructs the CPU 11 to read a background image BP corresponding to the music data MDA, which was instructed to be played back by the player, out of a background image file BPF of the game software GSW. Many background images BP to be used as the background at the time of playing the music data MDA are stored in the background image file BPF so as to correspond to each music data MDA. Each background image BP is comprised of a basic image BP1 and an option image BP2 concerning each music data MDA.

Figure 4:
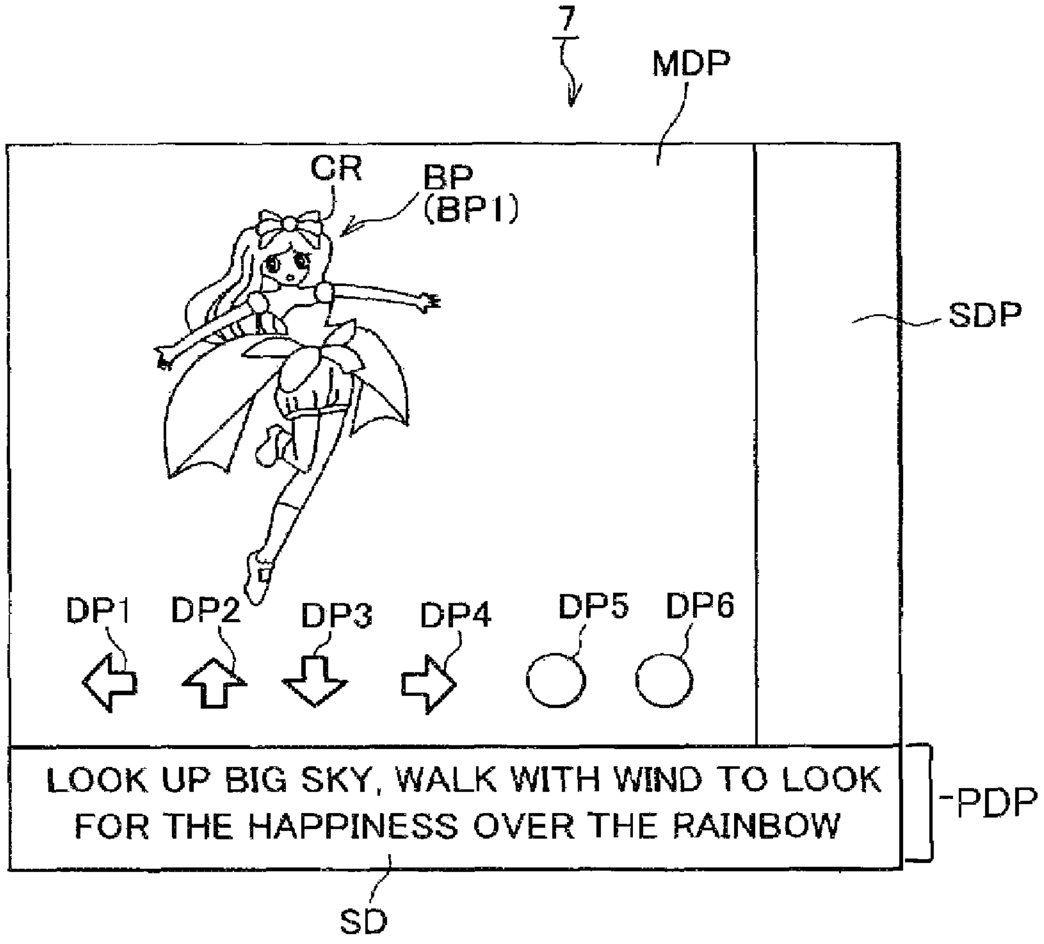
FIG. 4 is a view after deletion of command images from the game screen of FIG. 3.

As shown in FIG. 4 for instance, the basic image BP1 is an image file formed by a stationary image or an animation of a character CR prepared for each music data MDA, and is located and displayed at the background of a command screen CP1 where the command images CP are displayed during playing with the music data MDA by the instruction of the player. The option image BP2 is a dancing animation of the character CR displayed on the basic image BP1 with exaggerated gesture, or the stationary image or the animation of the character CR seen from various angles (not shown), and is displayed for a predetermined time on the display 3 in place of the basic image BP1 when pushing any of both push button switches 6 (A button and B button) of the input device 4, which is provided separate from the operation member 5*a* for inputting the command line DCL, at a proper timing.

After respectively reading the music data MDA selected by the player, and the command line DCL and the background image BP which correspond to the selected music data MDA out of the music file MFL and the background image file BPF so as to be produced, the player instructs playing start through the input device 4. Then, the CPU 11 starts to produce a play screen PP3 through the image processing circuit 14 according to display process program of the music game software GSW, and computes for scrolling down the command screen CP1 from the upper direction of FIG. 3 according to command image display program CPC described hereinafter.

As shown in FIG. 3, the play screen PP3 is divided into a main display area MDP for displaying the command screen CP1 and the background image BP, a words display area PDP for displaying song data SD of the selected music data MDA, and a sub display area PDP for displaying a score SCO of the game and an assistance character SCR. As already mentioned, the background image BP is displayed on the main display area MDP, overlapping the command screen CP1. The display process program DPP fixedly sets an operation criterion position SP in a level direction at a predetermined position of the bottom portion of the main display area MDP of the display in FIG. 3 through the image processing circuit 14 and displays it. Direction images DP1, DP2, DP3 and DP4 corresponding to direction signals DS outputted by the respective direction keys 5*b*, 5*c*, 5*d* and 5*e* of the input device 4, and button images DP5, DP6 respectively corresponding to the B button 6*b* and the A button 6*a* are produced and displayed on the operation criterion position SP.

The command image display program CPC sets six movement lanes L1, L2, L3, L4, L5 and L6 through the CPU 11 at the operation criterion position SP in the perpendicular direction to the respective direction images DP1, DP2, DP3 and DP4 and the button images DP5, DP6 which are displayed on the command screen CP1, as shown in FIG. 3.

Subsequently, the command image display program CPC locates the respective commands DC for comprising the command line DCL on the movement lanes L1, L2, L3 and L4 which correspond to the respective direction images DP1, DP2, DP3 and DP4 of the command screen CP1 (in the directions) through the CPU 11 on the basis of the command line DCL produced by the music processing program MPP, referring to the direction shown by the arrow of each command DC. At the same time, the command image display program CPC locates a position of each command DC (command image CP) in the up/down direction with respect to the operation criterion position SP so as to correspond to the playback order of the partial song data with melody PPD which corresponds to each command DC (command image CP) , referring to the attribute data of the respective partial song data with melody PPD of the music data MDA.

And, the command image display program CPC sets a distance DT between the respective command images CP which are displayed on the command screen CP1 in the up/down direction as the distance corresponding to the playback time, that is, the number of pixels corresponding to the playback time, referring to the playback time of each partial song data with melody PPD.

With the respective direction images DP1, DP2, DP3 and DP4 and the respective button images DP5 and DP6 which are located on the operation criterion position SP, displayed being fixed in the above-mentioned state, the command image display program CPC scrolls down all command images CP at a constant speed for the lower hand in FIG. 3. Then, the respective command images CP are controlled to pass through the operation criterion position SP for the lower hand in order set on the music data MDA and with a corresponding time interval to the playback time of the partial song data with melody PPD.

The player presses any of the respective direction keys 5*b*, 5*c*, 5*d* and 5*e* of the input device 4 corresponding to the direction image DP as soon as the player perceives passage of each command image CP through the corresponding direction image DP1, DP2, DP3 or DP4 which is located on the operation criterion position SP, watching the command image CP displayed on the display 3, scrolled from the upper hand for the lower hand in the screen.

When the CPU 11 detects the operation of pressing down of each direction key 5*b*, 5*c*, 5*d* or 5*e* of the input device 4, a corresponding signal SG1 is inputted in the CPU 11. The CPU 11 computes and judges how much time lag there is between the timing of inputting the inputted signal SG1, that is the timing of pressing down the direction key 5*b*, 5*c*, 5*d* or 5*e* and the timing of passing the corresponding command image CP through the direction image DP which is located on the operation criterion position SP on the basis of timing judging program TDP of the music game software GSW. The CPU 11 watches which command image CP of a plurality of command images CP which are scrolled for the lower hand on the display 3 at a constant speed firstly reaches the operation criterion position SP with the timing judging program TDP, and judges the direction key 5*b*, 5*c*, 5*d* or 5*e* which was operated by the player and computes its timing of pressing down on the basis of the point of time the nearest command image CP in the command screen CP1 with respect to the operation criterion position SP passes through the operation criterion position SP.

The timing judging program TDP judges through the CPU 11 the operation of the direction key 5*b*, 5*c*, 5*d* or 5*e* of the direction different from one which the command image CP passing through the operation criterion position SP indicates to be "error operation" in spite of its pressing timing, and computes a predetermined evaluation point VT as an accumulated evaluation value VL of the RAM 13 and stores it. On the contrary, when judging that the player operated the direction key 5*b*, 5*c*, 5*d* or 5*e* of the direction the same as one indicated by the command image CP which passed through the operation criterion position SP, the CPU 11 computes time difference between the time the command image CP passed through the operation criterion position SP and the time of pressing the direction key 5*b*, 5*c*, 5*d* or 5*e* by the player (the time the signal SG1 was inputted), and obtained the evaluation point according to the time difference.

The CPU 11 obtains the evaluation point every each demand command DC, that is, every each command image CP by computing the operation timing of the direction key 5*b*, 5*c*, 5*d* or 5*e* by the player according to the timing judging program TDP, and accumulates the respective evaluation points so as to obtain the accumulated evaluation value VL and stores it in the RAM 13.

The bigger the time difference with the point of time the player pressed down the direction key 5*b*, 5*c*, 5*d* or 5*e* (the time the signal SG1 was inputted) is on the basis of the time the command image CP passed through the operation criterion position SP, the bigger the evaluation point VT is (but, is a maximum limitation value or less). If the time difference exceeds a predetermined time or "error operation " is judged, a predetermined maximum limitation value is set. If the direction key 5*b*, 5*c*, 5*d* or 5*e* was pressed down within a proper predetermined time, the timing judging program TDP judges to "be eligible", and processes for subtracting a predetermined value from the accumulated evaluation value VL in the RAM 13. In this way, the accumulated evaluation value VL, adding the evaluation point VT whenever each command image CP passes through the operation criterion position SP is stored in the RAM 13. But, the high accumulated evaluation value VL means time lag between the pressing timing of the direction key 5*b*, 5*c*, 5*d* or 5*e* by the player and the time each command image CP passes through the operation criterion position SP of high frequency.

At the same time of the accumulation operation of the accumulated evaluation value VL with the timing judging program TDP, the CPU 11 executes music playback program MRP for playing back the music selected by the player from the speaker 7 through the sound processing circuit 15 according to the timing of pressing down the direction key 5*b*, 5*c*, 5*d* or 5*e* by the player by the timing judging program TDP.

If the CPU 11 judges to "be eligible" due to the operation of pressing down the direction key 5*b*, 5*c*, 5*d* or 5*e* within a predetermined proper time difference according to the timing judging program TDP, the music playback program MRP plays back the partial song data with melody PPD corresponding to the command image CP in a state of a standard pitch as it has been stored in the music file MFL through the sound processing circuit 15 together with the melody. In this case, the partial song data with melody PPD in the state of having been stored in the music file MFL is played back, so that the partial song data with melody PPD is played back in a proper pitch.

If the timing judging program TDP does not judge to "be eligible", that is, if the direction key 5*b*, 5*c*, 5*d* or 5*e* of the direction different from one indicated by the command image CP which passed through the operation criterion position SP was operated, or the direction key 5*b*, 5*c*, 5*d* or 5*e* was operated after the time which is judged to "be eligible" starting from the passage of the command image CP through the operation criterion position SP, the CPU 11 reads out the accumulated evaluation value VL stored in the RAM 13 according to the music playback program MRP, and manipulates the pitch according to the accumulated evaluation value VL on the partial song data with melody PPD corresponding to the command image CP which passed through the operation criterion position SP, and plays back the partial song data with melody PPD which received the pitch process from the speaker 7 through the sound processing circuit 15.

Figure 5:
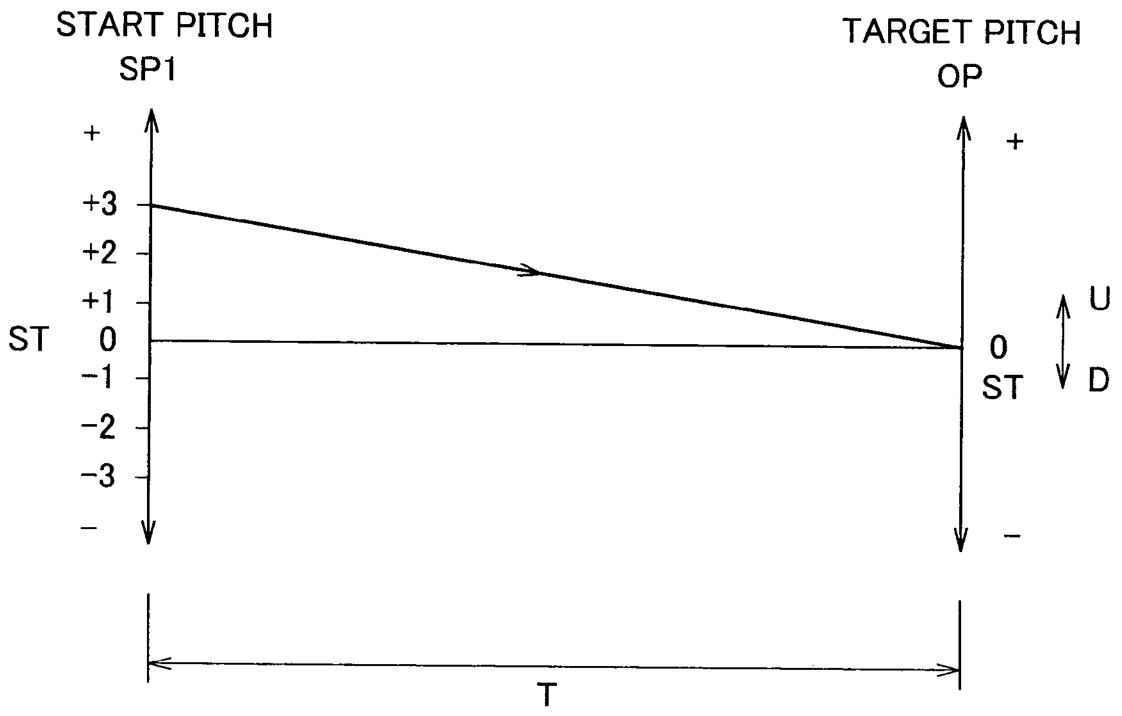
FIG. 5 is a view for showing an instance of pitch control.

That is, the music playback program MRP reads out the accumulated evaluation value VL which is stored in the RAM 13, and changes an original pitch the quantity of the pitch corresponding to the accumulated value VL so as to determine a start pitch SP1 of the corresponding partial song data with melody PPD, and plays back the partial song data with melody PPD starting from the start pitch SP1. As shown in FIG. 5 for instance, the music playback program MRP gets the CPU 11 to compute and set a plurality of the start pitches SP1 which shift by stages every chromatic scale in up/down direction with respect to the pitch which is set as a start pitch, that is, the pitch to be firstly played back (a standard pitch ST) at the time when the partial song data with melody PPD which is stored in the music file MFL is played back (In an instance of FIG. 5, the start pitches are shown with six stages from −3 through +3 which shift every chromatic scale in the up/down direction with respect to the start pitch ST) according to the accumulated evaluation value VL, and plays back the partial song data with melody PPD starting from the start pitch SP1 which shifts one or more steps in the up/down direction according to the accumulated evaluation value VL. Then, the partial song data with melody PPD which is played back from the speaker 7 through the sound processing circuit 15 is not played back as a melody with the standard pitch ST which is originally stored in the music file MFL, but is played back in a so-called "tone-deaf" state that the pitch is shifted in the up or down direction according to the accumulated evaluation value VL. The position of the start pitch SP1 with the music playback program MRP is set, shifting from the standard pitch ST as the accumulated evaluation value VL is bigger, so that the higher the frequency of slipping the timing of pressing down of the direction key 5*b*, 5*c*, 5*d* or 5*e* by the player from the time each command image CP passed the operation criterion position SP is, the more the position of the start pitch SP1 at the time of playback of the partial song data with melody PPD is apart from the standard pitch ST. In this case, the degree of "tone-deafness" is controlled to become higher.

If the timing judging program TDP judges the operation of the direction key 5*b*, 5*c*, 5*d* or 5*e* by the player to be "error operation" or judges that the difference between the time the player pressed the direction key 5*b*, 5*c*, 5*d* or 5*e* (the time the signal SG1 was inputted) and the time the command image CP passed through the operation criterion position SP exceeding a predetermined time, the corresponding partial song data with melody PPD is not played back.

And, the music playback program MRP plays back the partial song data with melody PPD in the standard pitch state as it has been stored in the music file MFL in spite of the accumulated evaluation value VL through the sound processing circuit 15 together with the melody when playing back the partial song data with melody PPD corresponding to the direction key 5*b*, 5*c*, 5*d* or 5*e* which was pressed with the timing judged to "be eligible " by the timing judging program TDP (that is, corresponding to the command image CP).

When pressing the direction key 5*b*, 5*c*, 5*d* or 5*e* with the timing judged to "be eligible" even if the accumulated evaluation value VL was accumulated to some degree, the partial song data with melody PPD is played back with the standard pitch as it has been stored in the music file MFL, and an endeavor of trying to press the direction key 5*b*, 5*c*, 5*d* or 5*e* with a correct timing by the player properly affects the playback of the partial song data PPD thereby. In other words, even the player whose accumulated evaluation value VL is high, does not become "tone-deaf", wherein the playback is executed shifting the start pitch SP1, if the player presses the direction key 5*b*, 5*c*, 5*d* or 5*e* with a good timing, so that the will to challenge the game is maintained, and the fun of the game does not decrease.

If the timing judging program TDP judges to "be eligible", the accumulated evaluation value VL which is stored in the RAM 13 is subtracted, as mentioned before. Then, the partial song data with melody PPD is played back, shifting the position of the start pitch SP1 with respect to the standard pitch ST on the basis of the accumulated evaluation value VL one stage on the standard pitch side if the accumulated evaluation value VL is lower than a predetermined level, even if the next judgment is not "eligible". Therefore, the degree of "tone-deafness" is improved in comparison with the last playback of the partial song data with melody PPD, the player's will to challenge the game is maintained in this regard, and the fun of the game does not spoiled thereby.

As mentioned before, the music playback program MRP plays back the partial song data with melody PPD, starting from the start pitch SP1 which shifts a predetermined pitch from the standard pitch ST in the upper or the lower direction when the timing judging program TDP does not judge to "be eligible". At this time, the music playback program MRP sets a target pitch OP which corresponds to the start pitch SP1, as shown in FIG. 5, and plays back the partial song data with melody PPD with time aiming for the target pitch OP. That is, the music playback program MRP starts to play back the partial song data with melody PPD from the start pitch SP1, and gradually changes the pitch at the time of the playback with time so as to reach the target pitch OP within a predetermined time T after the start of the playback.

This target pitch OP is controlled to properly swing in a up/down direction (in a direction as shown by arrows U and D of FIG. 5) with respect to the original standard pitch ST, and its amplitude is properly set on the basis of the accumulated evaluation value VL. By doing so, the playback of the partial song data with melody PPD, starting from the pitch shifting from the standard pitch ST is controlled to return to a predetermined standard pitch ST. With this control, the degree of "tone-deafness", that is, such a specific phenomenon of "tone-deaf" state that the pitch can not correctly return to the standard pitch ST due to the swinging target pitch OP which is set on the basis of the accumulated evaluation value VL, and the pitch during playback swings can be reproduced with reality.

It is not always necessary to set the target pitch OP, but the partial song data with melody PPD may be controlled to be played back so as to gradually return the pitch at the time of the playback to the standard pitch ST from the start pitch SP1.

When the player successively presses each direction key 5*b*, 5*c*, 5*d* or 5*e* so as to match the command image CP which is displayed scrolling in the up/down direction of the screen of FIG. 3, the CPU 11 judges the timing concerning each corresponding partial song data with melody PPD according to the timing judging program TDP, and judges to "be eligible" and processes for subtraction or accumulation of the accumulated evaluation value VL, and as the result, the CPU 11 and the sound processing circuit 15 play back the respective partial song data with melody PPD along the command line DCL with the music playback program MRP, so that the music data MDA comprised of the successive partial song data with melody PPD is played back from the speaker 7.

The music data MDA is played back from the speaker 7 by playing back the respective partial song data with melody PPD in order along the command line DCL. Then, some partial song data with melody PPD is correctly played back with the standard pitch ST and another is played back in "tone-deaf" state that it is played back starting from the start pitch SP1 shifting a predetermined pitch in the upper or lower hand with respect to the standard pitch ST according to the timing of the pressing of the direction key 5*b*, 5*c*, 5*d* or 5*e* by the player.

At the time of producing the command screen CP1, the command image display program CPC produces a plurality of image commands PIC concerning the background image BP corresponding to the selected music data MDA so as to correspond to the operation keys excluding the direction keys 5*b*, 5*c*, 5*d* and 5*e* in addition to the command line DCL. In case of FIG. 3, the command image display program CPC produces the image commands PIC so as to correspond to both push button switches 6 (A button and B button).

Both produced image commands PIC are located on the proper positions of the movement lanes L5 and L6 of the button images DP5 and DP 6 which are respectively corresponded to the B button and A button of the command screen CP1 according to the command image display program CPC. The image commands PIC are displayed scrolling down the screen in the lower hand of FIG. 3, synchronizing with the command images CP corresponding to the direction keys 5*b*, 5*c*, 5*d* and 5*e* by the CPU 11 according to the command image display program CPC. Then, the player presses a corresponding push button switch 6 (A button and B button) when the image commands PIC which move for the lower hand on both movement lanes L5, L6 of FIG. 3 pass through the corresponding button images DP5 and DP6.

If the CPU 11 judged that the player pressed down the corresponding push button switch 6 (A button and B button) within the predetermined time difference on the basis of the time the image commands PIC passed the corresponding button images DP5, and DP6 (including early pressing and delay pressing) according to the timing judging program TDP, the CPU 11 judges to "be eligible", and displays the option image BP2 as the background image BP in place of the basic image BP1. By doing so, the background image BP can be displayed in various forms, thereby expecting increase of the will to challenge the game and improvement of fun of the game.

If the judgment is that the player did not press down the corresponding push button switch (A button and B button) within the predetermined time difference on the basis of the time the image commands PIC passed through the corresponding button images DP5 and DP6 (including early pressing and delay pressing), the background image BP remains the basic image BP1 without any change.

At the time of playback of each music data MDA selected by the player, the music game software GSW gets the CPU 11 to execute evaluation program VAP so as to compute an evaluation point with a predetermined operation expression on the basis of the state of operation of the direction key by the player which was judged by the timing judging program TDP and the accumulated evaluation value VL. Then, the evaluation point is displayed as the score SCO on the sub-display area SDP of the play screen PP3.

And, the CPU 11 reads the assistant character SCR which is stored corresponding to the music data MDA during the playback out of an assistant character file CT1 according to the value of the score SCO and the accumulated state of the accumulated evaluation value VL on the basis of the display process program DPP, and displays the character SCR on the sub-display area SDP, as shown in FIG. 3.

In the above-mentioned embodiment, the CPU 11 is a game control unit, and the combination of the CPU 11 and specific software comprises various kinds of means of the game control unit, but at least a part of these means may be replaced by a logical circuit.

Besides, the invention may be utilized as amusement software for getting a computer to execute and an electronic game equipment using a computer.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. Music game program stored in a computer readable medium for getting a computer to output music data corresponding to music selected by a player through an input means from a sound output means and to execute a procedure for displaying a background image corresponding to said music data on a display, comprising:

- a music file for storing a plurality of said music data;
- said music data having song data with melody being comprised of words and a melody corresponding to said words;
- said song data with melody having a plurality of partial song data with melody obtained by dividing the whole words and the whole melody in the plural number in its playback order; and
- each said partial song data with melody being comprised of words having one or more characters and melody corresponding to said words;
- said music game program being a program for getting said computer to further execute following procedures:
- demand command computing procedure for reading said music data corresponding to said music selected by said player through said input means out of said music file and for computing a demand command for inviting said player to operate a specific operation key of said input means so as to correspond to each said partial song data with melody of said read music data;
- a command image producing procedure for producing each said demand command as a command image corresponding to each said operation key of said input means;
- a command image displaying procedure for displaying said produced command image, being moved on said display in the order of playback of said partial song data with melody, and for setting an operation criterion position at a predetermined position on said display and displaying it;
- a timing judging procedure for judging as to whether or not said operation key was operated with a predetermined timing on the basis of a positional relation between said command image displayed moving on said display and said operation criterion position;

a music playback procedure for arithmetically processing for changing a pitch at the time of playback of said partial song data with melody corresponding to said command image from a pitch which is stored in said music file according to a judgment result of an operation timing of said operation key corresponding to each said command image by said timing judging procedure and for outputting through said sound output means;

said timing judging procedure has an accumulated evaluation value computing procedure for computing time difference between a time said command image displayed being moved on said display passed through said operation criterion position and a time said operation key was operated, for computing an evaluation point which corresponds to said computed time difference for each said command image, for obtaining an accumulated evaluation value by accumulating said evaluation point for each command image, and for storing said accumulated evaluation value in a memory means;

said accumulated evaluation value computing procedure having a pass judgment procedure for executing a procedure of subtracting a predetermined value from said accumulated evaluation value which has been accumulated by judging if said time difference is within predetermined bounds in connection with each said command image;

said music playback procedure having a start pitch change procedure for setting and playing back a start pitch at the time of playback of said partial song data with melody which corresponds to said command image which is not judged to be passed by said pass judgment procedure, shifting from a standard pitch of said partial song data with melody which is stored in said music file as said accumulated evaluation value at the time when playing back said partial song data with melody which corresponds to said command image which is not judged to be passed is larger; and said music playback procedure having a pass playback procedure for playing back said partial song data with melody with said standard pitch of said partial song data with melody which corresponds to said command image judged to be passed, which is stored in said music file in spite of said accumulated evaluation value in said memory means at the time when playing back said partial song data with melody which corresponds to said command image which is judged to be passed by said pass judgment procedure when playing back.

2. The music game program stored in the computer readable medium according to claim 1, wherein said music playback procedure has a playback pitch changing procedure for playing back said partial song data with melody, changing a pitch to be played back with time during a predetermined time after start of playback according to said accumulated evaluation value at the time when playing back said partial song data with melody which corresponds to said command image which is judged to be passed by said pass judgment procedure when playing back.

3. Music game machine for outputting music data corresponding to music selected by a player through an input means from a sound output means and for displaying a background image corresponding to said music data on a display, comprising:

a music file for storing a plurality of said music data;

said music data having song data with melody being comprised of words and a melody corresponding to said words;

said song data with melody having a plurality of partial song data with melody obtained by dividing the whole words and the whole melody in the plural number in its playback order; and each said partial song data with melody being comprised of words having one or more characters and melody corresponding to said words;

said music game machine further comprising:

a demand command computing means for reading said music data corresponding to said music selected by said player through said input means out of said music file and for computing a demand command for inviting said player to operate a specific operation key of said input means so as to correspond to each said partial song data with melody of said read music data;

a command image producing means for producing each said demand command as a command image corresponding to each said operation key of said input means;

a command image displaying means for displaying said produced command image, being moved on said display in the order of playback of said partial song data with melody, and for setting an operation criterion position at a predetermined position on said display and displaying it;

a timing judging means for judging as to whether or not said operation key was operated with a predetermined timing on the basis of a positional relation between said command image displayed moving on said display and said operation criterion position;

a music playback means for arithmetically processing for changing a pitch at the time of playback of said partial song data with melody corresponding to said command image from a pitch which is stored in said music file according to a judgment result of an operation timing of said operation key corresponding to each said command image by said timing judging means and for outputting through said sound output means;

said timing judging means has an accumulated evaluation value computing means for computing time difference between a time said command image displayed being moved on said display passed through said operation criterion position and a time said operation key was operated, for computing an evaluation point which corresponds to said computed time difference for each said command image, for obtaining an accumulated evaluation value by accumulating said evaluation point for each command image, and for storing said accumulated evaluation value in a memory means;

said accumulated evaluation value computing means having a pass judgment means for executing an procedure of subtracting a predetermined value from said accumulated evaluation value which has been accumulated by judging to-be-pass if said time difference is within predetermined bounds in connection with each said command image;

said music playback means having start pitch change means for setting and playing back a start pitch at the time of playback of said partial song data with melody which corresponds to said command image which is not judged to be passed by said pass judgment procedure, shifting from a standard pitch of said partial song data with melody which is stored in said music file as said accumulated evaluation value at the time when playing back said partial song data with melody which corresponds to said command image which is not judged to be passed is larger; and said music playback means having a pass playback means for playing back said partial song data with melody with said standard pitch of said partial song data with melody which corresponds to said command image judged to be passed, which is stored in said music file in spite of said accumulated evaluation value in said memory means at the time when playing back said partial song data with melody which corresponds to said command image which is judged to be passed by said pass judgment means when playing back.

* * * * *